United States Patent
Shimo et al.

(10) Patent No.: US 8,187,428 B2
(45) Date of Patent: May 29, 2012

(54) LIQUEFYING APPARATUS

(75) Inventors: Yoshiko Shimo, Koshi (JP); Akinori Ito, Chigasaki (JP); Hitoshi Itagaki, Fujisawa (JP); Yasuo Ishikawa, Chigasaki (JP)

(73) Assignee: Blest Co., Ltd., Kanagawa (JP)

( * ) Notice: Subject to any disclaimer, the term of this patent is extended or adjusted under 35 U.S.C. 154(b) by 393 days.

(21) Appl. No.: 12/302,190

(22) PCT Filed: May 24, 2007

(86) PCT No.: PCT/JP2007/060572
§ 371 (c)(1),
(2), (4) Date: Dec. 3, 2008

(87) PCT Pub. No.: WO2007/138965
PCT Pub. Date: Dec. 6, 2007

(65) Prior Publication Data
US 2009/0117015 A1    May 7, 2009

(30) Foreign Application Priority Data
May 25, 2006  (JP) ................. P2006-145189

(51) Int. Cl.
*C10B 7/10*    (2006.01)
*C10B 43/00*   (2006.01)
*C10B 7/00*    (2006.01)

(52) U.S. Cl. ............. 202/118; 422/184.1; 422/229; 422/211; 202/116; 202/117; 201/2.5; 585/241

(58) Field of Classification Search ............... 422/184.1, 422/229, 211; 202/116, 117, 118; 201/2.5; 585/241
See application file for complete search history.

(56) References Cited

U.S. PATENT DOCUMENTS

| | | | |
|---|---|---|---|
| 4,851,601 A * | 7/1989 | Fukuda et al. | 585/241 |
| 5,366,595 A | 11/1994 | Padgett et al. | |
| 5,393,500 A * | 2/1995 | Kameda et al. | 422/186 |
| 5,686,055 A | 11/1997 | Takahashi et al. | |
| 5,836,524 A | 11/1998 | Wang | |
| 5,895,827 A | 4/1999 | Takahashi et al. | |
| 6,352,674 B2 * | 3/2002 | Matsubara et al. | 422/208 |
| 6,387,221 B1 * | 5/2002 | Schoenhard | 201/25 |
| 2005/0075521 A1 | 4/2005 | Wada et al. | |

FOREIGN PATENT DOCUMENTS

| | | |
|---|---|---|
| JP | 9-104874 | 4/1997 |
| JP | 10-15352 | 1/1998 |
| JP | 2003-213276 | 7/2003 |
| WO | WO 03/06456 | 8/2003 |

* cited by examiner

*Primary Examiner* — Walter D Griffin
*Assistant Examiner* — Lessanework Seifu
(74) *Attorney, Agent, or Firm* — Young & Thompson

(57) ABSTRACT

A conversion-to-oil apparatus capable of efficiently treating plastic, includes a melting unit for heating and melting plastic fed thereto and a decomposing unit for further heating and vaporization-decomposing the molten plastic melted by the melting unit, wherein the decomposing unit is inclined upwardly, having a lead screw mounted therein, and is provided at its upper end portion with a catalyst cylinder extending upwardly and a residue takeout unit extending downwardly, and the decomposing unit has a prevention element for preventing molten plastic gas from flowing down to the residue takeout unit.

6 Claims, 14 Drawing Sheets

LIQUEFYING APPARATUS

FIELD OF THE INVENTION

The present invention, relates to an apparatus for converting plastic back to oil.

DESCRIPTION OF THE RELATED ART

In recent years, along with rapid increase in global population and economic growth in many countries, environmental problems have been discussed as issues of global scale, the problems being, for example, insufficiency of natural resources for a rapidly increasing energy demand, global warming due to large consumption of fossil fuels, and disposal of garbage, scraps and various consumed products.

Therefore, recycling technologies are becoming much more important among the technologies for effectively utilizing the resources.

In the recycling technologies, there is known a small-sized apparatus for obtaining oil from waste plastic, for example, the apparatus comprising a hopper, a cylindrical melting unit having a lead screw mounted therein, a cylindrical decomposing unit for vaporization-decomposing plastic melted by the melting unit, and heaters wound around the melting unit and the decomposing unit, wherein the plastic is heated by the heater and vaporized, and the vaporized plastic gas is made to pass through a catalyst and cooled in a condenser to be liquefied, and the resultant liquid is taken out as oil, while residue is collected in a residue takeout unit (Patent Document 1).

[Patent Document 1] Japanese Unexamined Patent Publication No. 2003-213276

DISCLOSURE OF THE INVENTION

Problem to be Solved by the Invention

However, in order to efficiently treat a large quantity of and variously mixed plastics and to practically operate the apparatus for converting plastic to oil, such conventional apparatus needs more to be improved.

The present invention is pursued to solve such problem and an object of the present invention is to provide an apparatus for conversion-to-oil capable of efficiently treating plastic.

Means for Solving the Problem

The apparatus for conversion-to-oil according to the present invention comprises a melting unit for melting plastic by heating, and a decomposing unit for vaporizing and decomposing the molten plastic melted by the melting unit by further heating. The decomposing unit is inclined upward, having a lead screw therein and provided on its upper end portion with a catalyst cylinder directing upward and a residue takeout unit directing downward. The decomposing unit has a prevention means for preventing the molten plastic gas from flowing down to the residue takeout unit.

In an aspect, the prevention means for preventing the molten plastic gas from flowing down may be an open/close valve located at a takeout port of the residue takeout unit for taking out the residue. Further, close to the open/close valve may be arranged a heater for heating the inside of the residue takeout unit.

In another aspect, the prevention means for preventing the molten plastic gas from flowing down may be a suction unit located at a gas takeout port of the catalyst cylinder for taking out the molten plastic gas and for sucking the molten plastic gas.

In the other aspect, the prevention means for preventing the molten plastic gas from flowing down may be a cylinder valve, which connects to the lower side of the decomposing unit and has a spiral member rotatable so as to extrude the residue.

In the catalyst cylinder of the conversion-to-oil apparatus of the invention may be contained synthesis zeolite composed of silicon oxide and alumina.

Further, the conversion-to-oil apparatus of the invention may have a residue pot for collecting and heating the residue, located close to the end portion of the decomposing unit, the residue pot having an open/close lid.

Furthermore, the melting unit of the conversion-to-oil apparatus of the invention may be constructed to melt the plastic fed from the hopper by frictional heating due to the rotation of the screw in its cylinder and a heat applied from the heater.

In another aspect of this invention, the conversion-to-oil apparatus may comprise a melting unit for melting and feeding crushed plastic, and a decomposing unit for decomposing and vaporizing the molten plastic melted by the melting unit, wherein the melting unit and the decomposing unit have, respectively, lead screws rotated by motors, and the melting unit and the decomposing unit are respectively heated by heaters. The conversion-to-oil apparatus has a diesel-powered generator driven by bubbling-treated oil, which is obtained by subjecting the oil produced by the conversion-to-oil apparatus to bubbling treatment for removing gasoline content. By the power from this generator operate the electric driven units such as the heaters and motors.

In still another aspect of this invention, the conversion-to-oil apparatus may comprise a melting unit for melting and feeding crushed plastic, and a decomposing unit for decomposing and vaporizing the molten plastic melted by the melting unit, wherein the melting unit and the decomposing unit have, respectively, lead screws rotated by motors, and the melting unit and the decomposing unit are respectively heated by heaters. The conversion-to-oil apparatus has a diesel-powered generator driven by blended oil, which is obtained by blending the oil produced by the conversion-to-oil apparatus with food oil.

In the other aspect of this invention, the conversion-to-oil apparatus may comprise a melting unit for melting and feeding crushed plastic, and a decomposing unit for decomposing and vaporizing the molten plastic melted by the melting unit, wherein the melting unit and the decomposing unit, respectively, have lead screws rotated by motors, and the melting unit and the decomposing unit are respectively heated by heaters. In this conversion-to-oil apparatus, the generator is powered by an off-gas generated during the liquefaction of plastic and the oil produced by the conversion-to-oil apparatus. This produced oil is the bubbling-treated oil, of which gasoline content is removed by bubbling treatment.

In the other aspect of this invention, the conversion-to-oil apparatus may comprise a melting unit for melting and feeding crushed plastic, and a decomposing unit for decomposing and vaporizing the molten plastic melted by the melting unit, wherein the melting unit and the decomposing unit, respectively, have lead screws rotated by motors, and the melting unit and the decomposing unit are respectively heated by heaters. The conversion-to-oil apparatus has a diesel-powered generator driven by off gas generated during the liquefaction of plastic and the oil produced by the conversion-to-oil apparatus. The produced oil is blended with food oil.

Effect of the Invention

According to the present invention, since a prevention means (fan for pressure control, valves of residue takeout unit, etc.) for preventing the vaporized gas from coming into the residue takeout unit and being liquefied to cause non-decomposed oil is provided around the catalyst cylinder of the decomposing unit, such non-decomposed oil could not be stored in the residue tank and thus plastic can be efficiently treated.

Further, the conversion-to-oil apparatus of the invention has a diesel-powered generator, and in the case of using the bubbling-treated oil obtained by removing gasoline content from the produced oil or the blended oil obtained by blending the produced oil with food oil, the generator can be smoothly and efficiently operated and therefore plastic can be efficiently treated.

Furthermore, if a dual fuel engine is employed for the generator, it is possible to make good use of off-gas as an energy. Thus plastic can be efficiently treated.

EXPLANATION OF REFERENCE NUMERALS

Figure 1:
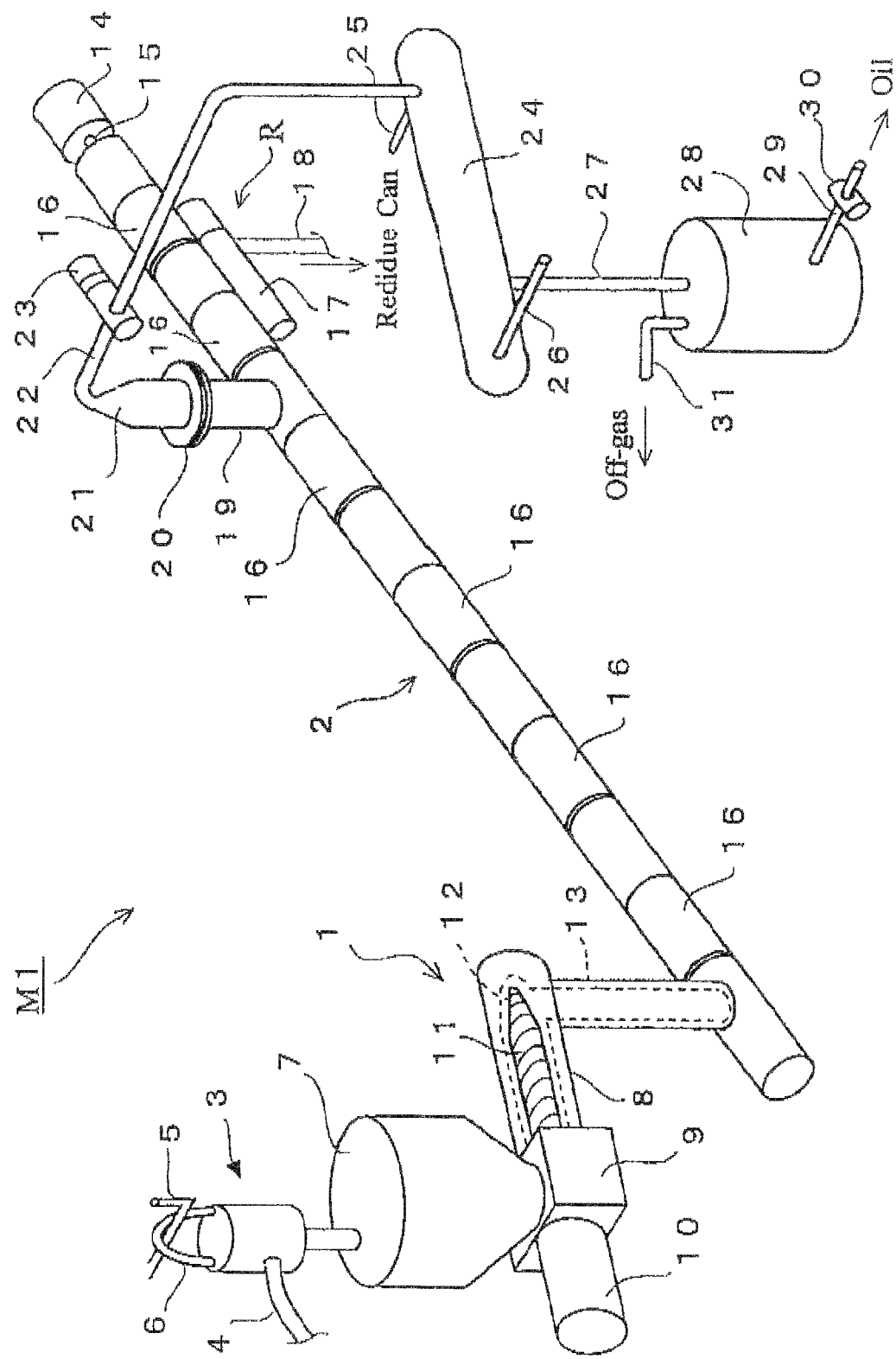
FIG. 1 is a perspective view showing a conversion-to-oil apparatus of the present invention as a whole.

1: gel forming unit (melting unit)
2: decomposing unit
7: hopper
8: cylinder
11: screw
17: cylinder valve
18: residue pipe
19: catalyst cylinder
23: suction unit
28: oil tank
30: filter
50: bubbling unit
51: blending vessel
53: food oil tank
58: controller
60: generator
110: dual fuel engine
301: hopper
302: first melting unit
303: second melting unit
304: vaporizing unit
313: catalyst cylinder
314: residue pipe
317: first condenser
318: second condenser

PREFERRED EMBODIMENTS FOR CARRYING OUT THE INVENTION

Hereafter, embodiments of the present invention will be described in detail with reference to the drawings.

First Embodiment

In FIG. 1, a conversion-to-oil apparatus M1 according to a first embodiment of the present invention comprises a gel-forming unit 1 for melting crushed plastic pieces into plastic gel, and a decomposing unit 2 for thermally decomposing the plastic gel melted by the gel-forming unit 1. The gel-forming unit 1 is provided with a feeding unit 3 for feeding the crushed plastic pieces to a hopper 7. The feeding unit 3 has a feeding pipe 4, in which a known spiral member (not-shown) is mounted. By rotation of the spiral member, the plastic is continuously fed to the hopper 7. The feeding unit 3 has a hanging member 6 held by a holding hook 5.

The hopper 7 is fixed to a frame body 9, and a cylinder 8 extends horizontally from the frame body 9. In the cylinder 8 is mounted a screw 11, which rotates in a space hole 12, and a vertical hole 13 extends downward from the end of the space hole 12.

The screw 11 rotates by means of a motor 10 mounted to the frame body 9. A wall of the space hole 12 is heated an electrical heater (not shown) installed in the cylinder 8.

The gel-forming unit 1 melts the plastic pieces fed from the hopper 7 by frictional heating due to the rotation of the screw 11 in the cylinder 8 and the heat applied by the heater not shown, thus forming the plastic gel. Specifically, the plastic pieces in the hopper 7 are continuously fed into the cylinder 8 and fed through in the space hole by the rotation of the screw 11 and at the same time the plastic pieces are being melted into plastic gel by the frictional heating due to the feeding force of the screw 11 and the heat from the heater not shown. Thus, by using the forcible feeding action of the screw, the problem that the cylinder 8 is liable to be clogged by some kind of plastic, PET for example, having an increasing moisture content and a high melting point, and the viscosity of which increases as the plastic pieces are melted solely by the heat from the heater can be solved. Here, as the forcible feeding means may be employed a means such as used in the extrusion forming method and the injection forming method for forming plastic.

The decomposing unit 2 is inclined upward and has a lead screw LS (FIG. 2) in it. Namely, the bottom end of the vertical hole 13 is connected to the lower portion of the cylindrical decomposing unit 2, in which the lead screw LS is mounted. The lead screw LS is comprised of a shaft 15 and blades 15a disposed around the shaft 15. By the lead screw LS, the plastic gel and the vaporized plastic gas (vaporized gas or molten plastic gas) are guided in a spiral fashion. The upper end of the lead screw LS is connected to a motor 14. Around the cylindrical body of the decomposing unit 2 are mounted belt-like heaters 16, 16 . . . 16 at a predetermined intervals, the heaters 16 being covered with heat insulator (not shown).

Figure 2:
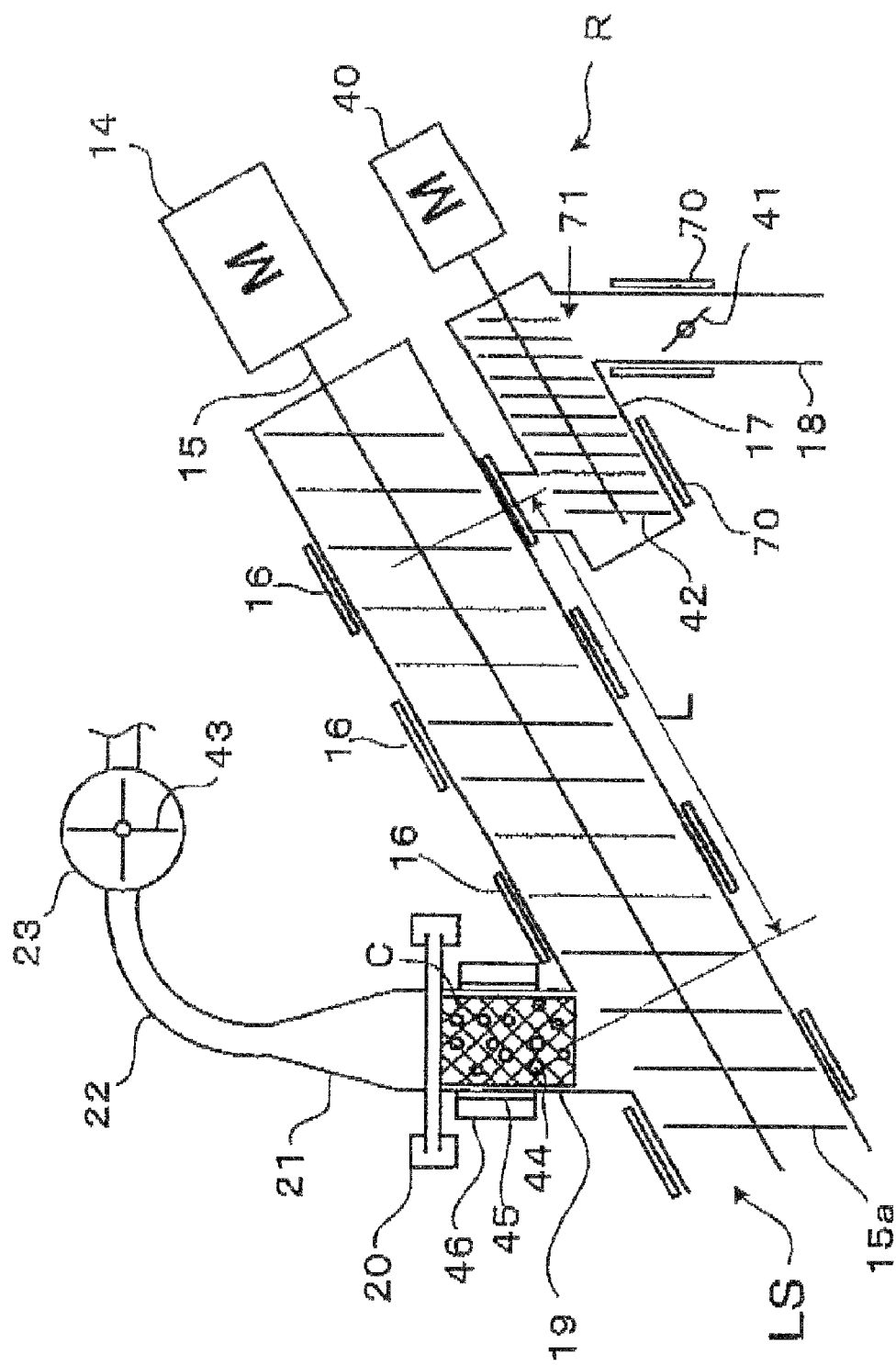
FIG. 2 is an exploded view showing an inner structure of the upper portion.

At the upper end portion of the decomposing unit 2 is provided a residue takeout unit directed downward. Concretely, as shown in FIG. 2, the residue takeout unit R is located at the lower side of the upper portion of the cylindrical body of the decomposing unit 2. The residue takeout unit R has a cylindrical valve 17 connected to the lower side surface of the cylindrical body of the decomposing unit. The cylindrical valve 17 is one of the prevention means for preventing the molten plastic gas from flowing down to the residue takeout unit R.

The cylindrical valve 17 has a spiral member, which rotates to extrude the residue. Concretely, in the cylindrical valve (spiral valve) 17 is mounted a spiral member 42, which rotates slowly by a motor 40 so as to prevent the vaporized gas from directly coming into a residue pipe 18. By this prevention for the vaporized gas from directly coming into the residue pipe 18, the vaporized gas and the residue can be reliably separated from each other to thereby enhance the efficiency of recovering oil.

In addition, downwardly from the lower side of the upper portion of the cylindrical valve 17 extends the residue pipe 18, in which an open/close valve 41 is mounted. The open/close valve 41 is closed to completely shut off the gas flowing to a residue tank, while the open/close valve 41 is periodically opened so as to discharge the residue. The open/close valve 41 is also one of the prevention means for preventing the molten plastic gas from flowing down to the residue takeout unit R. Namely, the open/close valve 41 serving as the prevention means for preventing the molten plastic gas from flowing down is located to be opened and closed at the residue takeout port of the residue takeout unit R, and adjacent to the open/close valve 41 is arranged a heater 70 for heating the inside of the residue takeout unit R.

Further, around the cylinder including the spiral member 42 and the pipe including the open/close valve 41 are arranged heaters 70, 70 . . . 70 for heating the vaporized gas existing above the cylindrical valve 17 and the open/close valve 41, the heaters serving to prevent the vaporized gas from being liquefied. In particular, the heater 70 around the pipe including the open/close valve 41 protects the function of the open/close valve 41 from being degraded, because the function of the open/close valve would be damaged if the residue is cooled to be a solid block (the open/close valve 41 would be no longer closed due to such block of the residue, with the result that the vaporized gas would flow into the residue takeout unit R, for instance). With the open/close valve 41 effectively operated, the vaporized gas and the residue can be reliably separated from each other so that the efficiency of recovering oil is improved. In addition, with the arrangement of the heaters 70 substantially from the connecting portion between the cylindrical valve 17 and the residue pipe 18 to the open/close valve 41, the open/close valve 41 can be much more efficiently operated.

Furthermore, a means for introducing nitrogen 71 from the upper end of the residue pipe 18 may be employed for preventing the vaporized gas from flowing-down. This is also one of the prevention means for preventing the molten plastic gas from flowing down to the residue takeout unit R. Namely, this means serves to prevent the flow-down of the gas vaporized from the decomposing unit 2 to the residue takeout unit R by way of increasing the pressure on the side of the residue takeout unit R.

At the upper end portion of the decomposing unit 2 is provided a catalyst cylinder 19 extending in the upward direction. Specifically, at a position downwardly apart from the cylinder valve 17 is located the catalyst cylinder 19, in which a catalyst composed of zeolite 44 is contained via a detachable cage C. Around the outer periphery of die catalyst cylinder 19 are attached a heater 45 for thermal control and a water-cooling jacket 46, by which the catalyst in the cylinder 19 is thermally controlled. The catalyst cylinder 19 has an upper flange detachably mounted by a flange of an enlarged portion of a guide pipe 22 and a clamp 20. By this configuration, the cage C for the catalyst is detachable so that the catalyst can be changed after having been used for a predetermined time. The catalyst may be of synthesis zeolite preferably having an effective fine diameter of 9 to 10 mm and having a ratio of 2.5 times $SiO_2$ to $Al_2O_3$, and of spherical piece having a size of 2.4 to 4.7.

A quantity of the catalyst may correspond to the quantity of the plastic pieces to be treated. For instance, nearly 10 kg catalyst is required for treating 10 kg plastic pieces per hour, that is, substantially the quantity of the plastic pieces to be treated and that of the catalyst correspond to each other by 1:1 in weight.

In other words, with a less quantity of the catalyst, the plastic pieces could not completely be decomposed, causing non-decomposition oil, while an excessive quantity of the catalyst would unfavorably cause a flow resistance to increase.

At the guide pipe 22 serving as a molten plastic gas takeout portion of the catalyst cylinder 19 is provided a suction unit 23 having a fan 43, by which the vaporized gas is sucked to cause a negative pressure so that the vaporized gas can smoothly pass through the catalyst cylinder without flowing into the residue pipe 18. Thus, this unit is also one of the prevention means for preventing the molten plastic gas from flowing down to the residue unit R. In addition, as the prevention means for preventing the molten plastic gas from flowing down to the residue takeout unit R, two or more of the above-mentioned prevention means may be selectively combined to each other. The combination of the plural prevention means enhances the function of preventing the molten plastic gas from flowing down to the residue takeout unit R.

Incidentally, it is required to set a distance L between the center of a flow inlet of the catalyst cylinder 19 and the center of the port of the cylinder valve 17 at least 35 cm and more. With the distance of 45 cm, the quantity of the vaporized gas flowing to the residue pipe 18 decreases remarkably. Without the cylinder valve 17 but the residue pipe 18 is directly connected to the cylindrical body of the decomposing unit, the center of the port of the residue pipe corresponds to the center of a spiral valve 17.

The guide pipe 22 is, as shown in FIG. 1, connected to a water-cooling condenser 24, which has a water inlet pipe 26 and a discharge pipe 25. From the condenser 24 extends downwardly an oil pipe 27 and the oil liquefied in the condenser 24 is stored in an oil tank 28. From the oil tank 28 extend an off-gas pipe 31 for discharging non-liquefied off-gas and an oil pipe 29 for taking-out collected oil, the oil pipe 29 having a filter 30.

Next, a power generation system is described with reference to FIG. 3.

Figure 3:
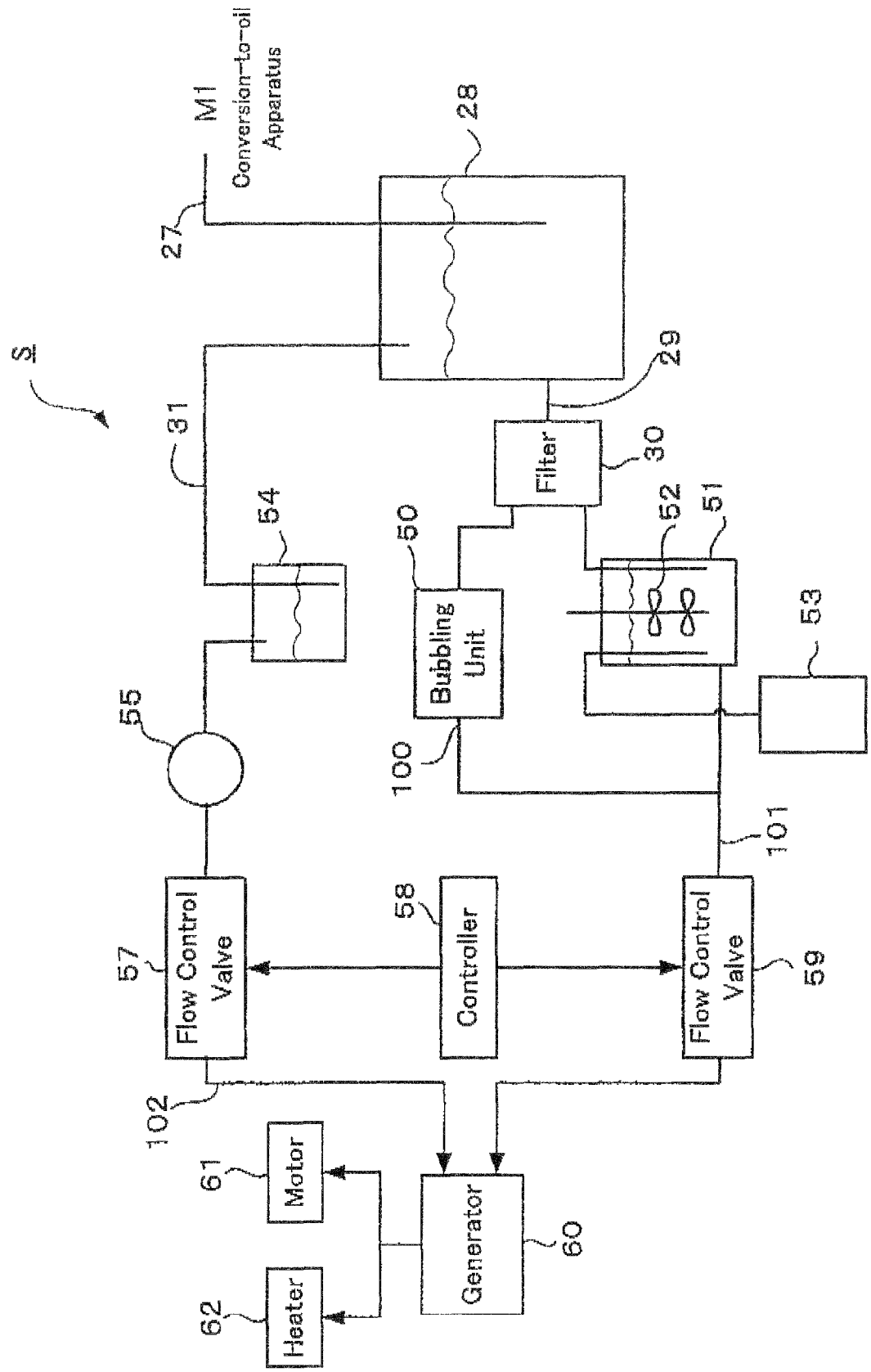
FIG. 3 is a diagram for chaining an electrical generating system.

The conversion-to-oil apparatus M1 comprising a melting unit 1 for melting and feeding crushed plastic, and a decomposing unit 2 for decomposing and vaporizing the molten plastic melted by the melting unit 1, wherein the melting unit and the decomposing unit, respectively, have lead screws rotated by motors 10, 14 and the melting unit and the decomposing unit are heated by heaters, respectively, further comprises, as shown in FIG. 3, a diesel-powered generator 60 driven by bubbling-treated oil, which is obtained by subjecting the oil produced by the conversion-to-oil apparatus M to bubbling treatment for removing gasoline content. The electric-driven units such as the heater 62 and the motor 61 operate by the power from this generator.

In FIG. 3, the oil pipe 29 is connected to a bubbling unit 50 in addition to the filter 30. The collected oil is subjected to the bubbling-treatment for removing gasoline content by the bubbling unit 50. The collected oil contains the mixture of gasoline, kerosene, light oil, and heavy oil. As the gasoline (contained in the mixture oil by approximately 10%) tends to wash away the lubricant of the engine, it needs be removed. Therefore, air is fed to the mixture oil to remove the gasoline content. The oil treated by the bubbling unit 50 passes through a line 100 and is fed to a line 101. At the line 101, the bubbling-treated oil has its flow quantity controlled by a flow control valve 59 and is fed to the generator 60. By the generator 60 operate the various motors 61 and heaters 62 of the conversion-to-oil apparatus M1.

Further, the generator 60 may be powered by the blend oil obtained by blending the oil produced by the conversion-to oil apparatus M1 with food oil. Concretely, the oil, instead of passing through the bubbling unit 50, filtrated by the filter 30 is fed to a blending vessel 51 having a stirrer 52. Waste food oil, which is composed of plant oil, is fed from a food oil tank 53 to the blending vessel 51, where the waste oil and the recovered oil are blended by the ratio of 1:1. Thus, when the waste oil is added to the recovered oil (in a proportion of 10% or more), action of the gasoline content is suppressed so that the blended oil even including the gasoline content becomes usable oil.

Furthermore, the generator 60 may be powered by both the off-gas generated during the liquefaction-to-oil of plastic and the product oil of the conversion-to-oil apparatus M1. Concretely, the generator 60 may operate solely by the blended oil, and if the generator 60 employs a dual-fuel engine as the diesel engine, both the blended oil and the off-gas become usable. Specifically, the gas, including the mixture of methane, ethane, propane and others, passes through the off-gas pipe 31 to a water-in tank 54. After passing through the water-in tank 54, the off-gas is stored in an accumulation tank 55, then passes through a flow control valve 57, which is controlled by a controller 58 (the flow control valve 59 is also controlled by the controller 58), and flows into the generator 60. The controller (CPU) 58 effectively prevents engine knocking by appropriately controlling the respective quantities of the blended oil and the off-gas for the engine of the generator.

Next, a controller system for the dual-fuel engine of the generator 60 is described in detail with reference to FIGS. 4 to 7.

Figure 4:
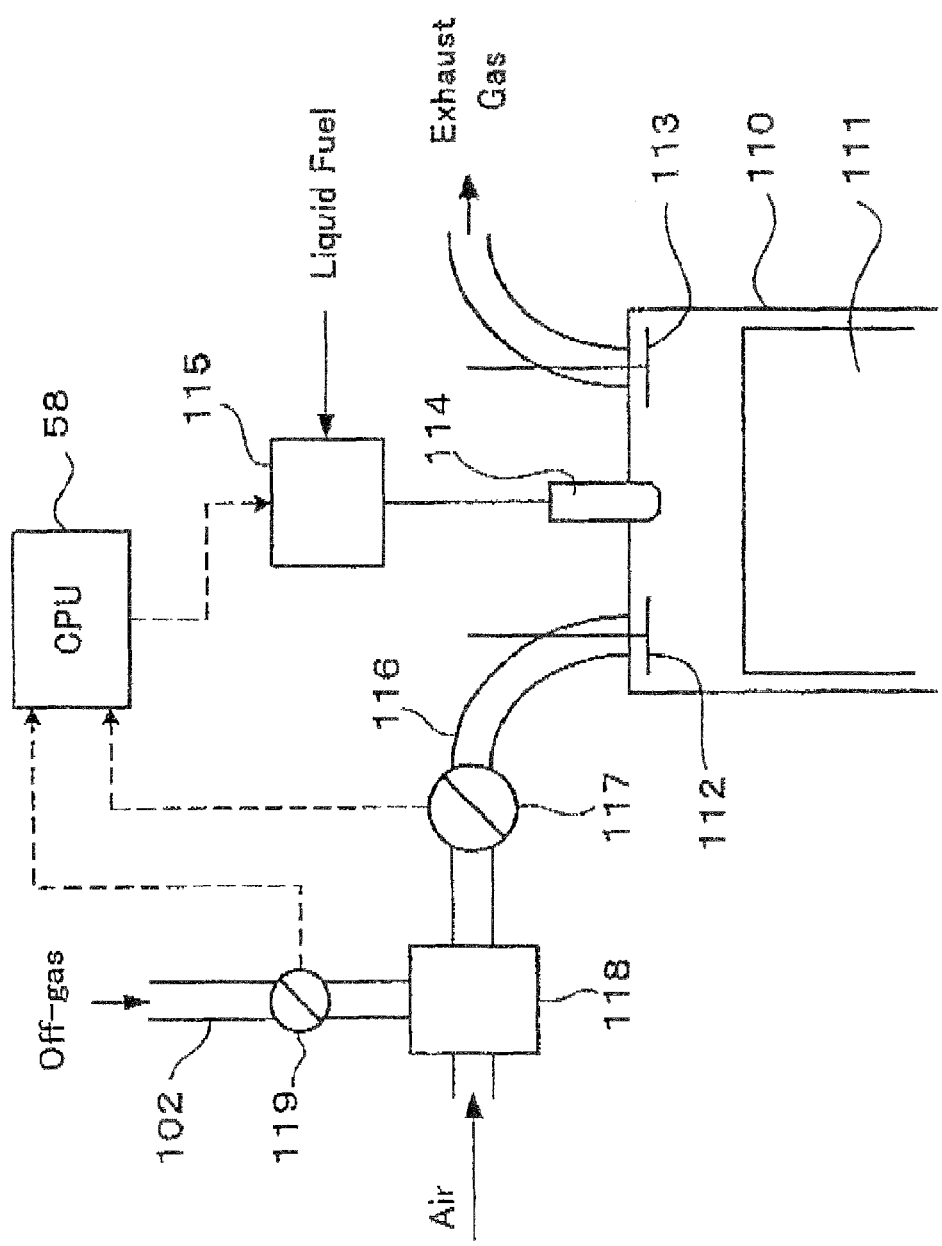
FIG. 4 is a diagram roughly showing a system of a dual fuel engine.
Figure 5:
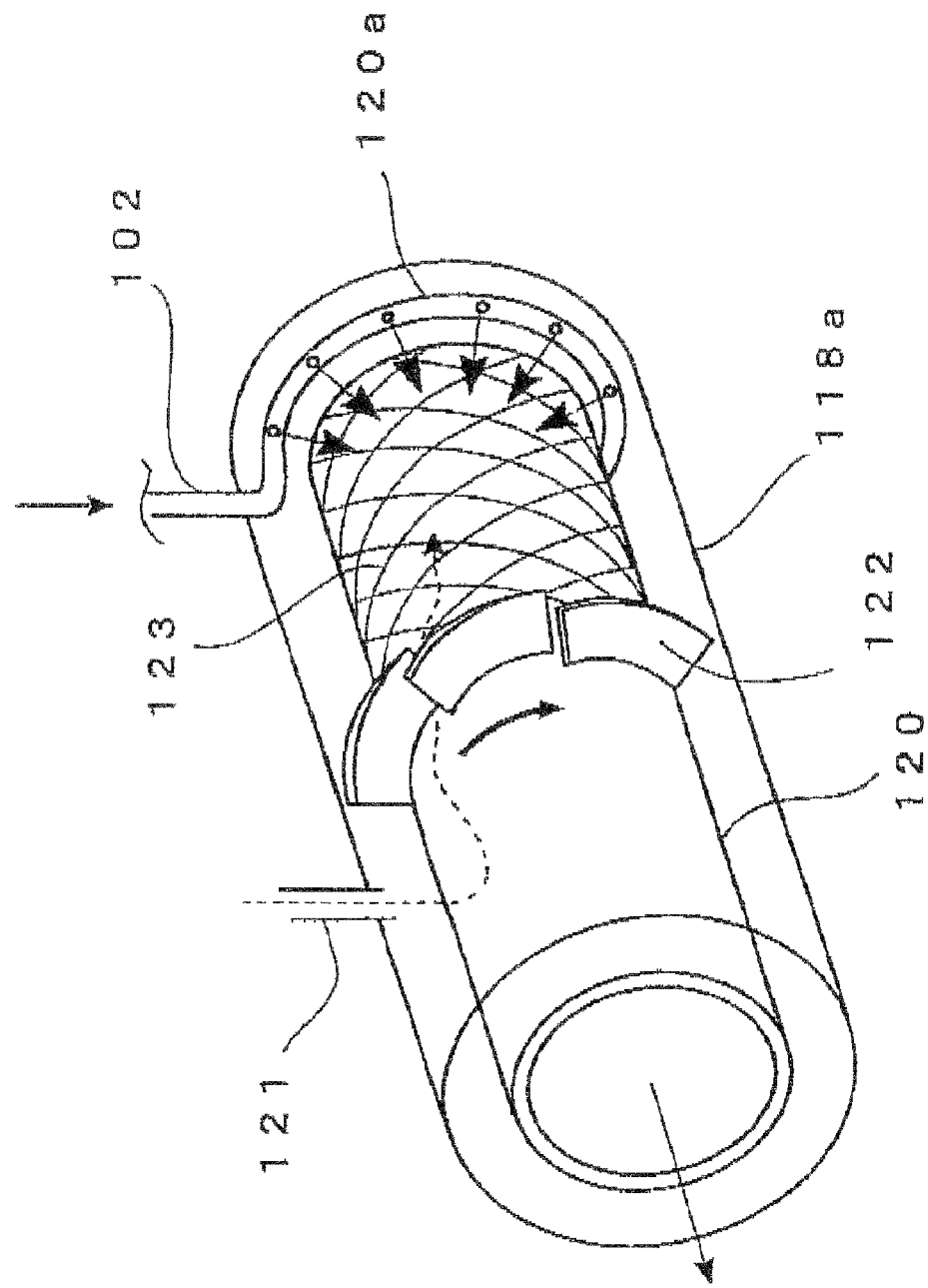
FIG. 5 is a perspective view showing a mixing unit of the dual fuel engine.

In FIG. 4, a dual-fuel engine 110 has a piston 111, and has a flow-in valve 112 and a discharge valve 113. Between both valves is provided an injection nozzle 114, to which the blended oil (i.e., the oil having been blended with the bubbling-treated oil or food oil) is supplied from an injection pump 115. A flow-in pipe 116 connected to the flow-in valve 112 is provided with a mixed gas control valve 117, which controls a quantity of the mixed gas flowed into the engine from a mixing unit 118 for mixing the off-gas with air. The mixing unit 118 is connected to a gas control valve 119 mounted to the off-gas pipe 102, and the control valves 117, 119 and the injection pump 115 are connected to the controller (CPU) 58. The mixing unit 118 has a cylindrical casing 118a, as shown in FIG. 5, in which an air filter 120 is mounted. The air passing through an inlet 121 is guided by guide blades 122 to pass through a filter unit 23 and flow to the cylinder. On the other hand, the off-gas passes through the off-gas pipe 102 and is supplied from an injection pipe 120a, which is circularly formed around an opening of the right end of the air filter 120 and injects the off-gas in a circular fashion. By this way, the off-gas and air is suitably mixed. Incidentally, the guide blades 122 rotate by the air supplied from the inlet 121 to thereby rotate the air filter. By this rotation, the off-gas from the off-gas pipe 102 and the air from the inlet 121 are uniformly mixed, thereby increasing combustion efficiency.

Figure 6:
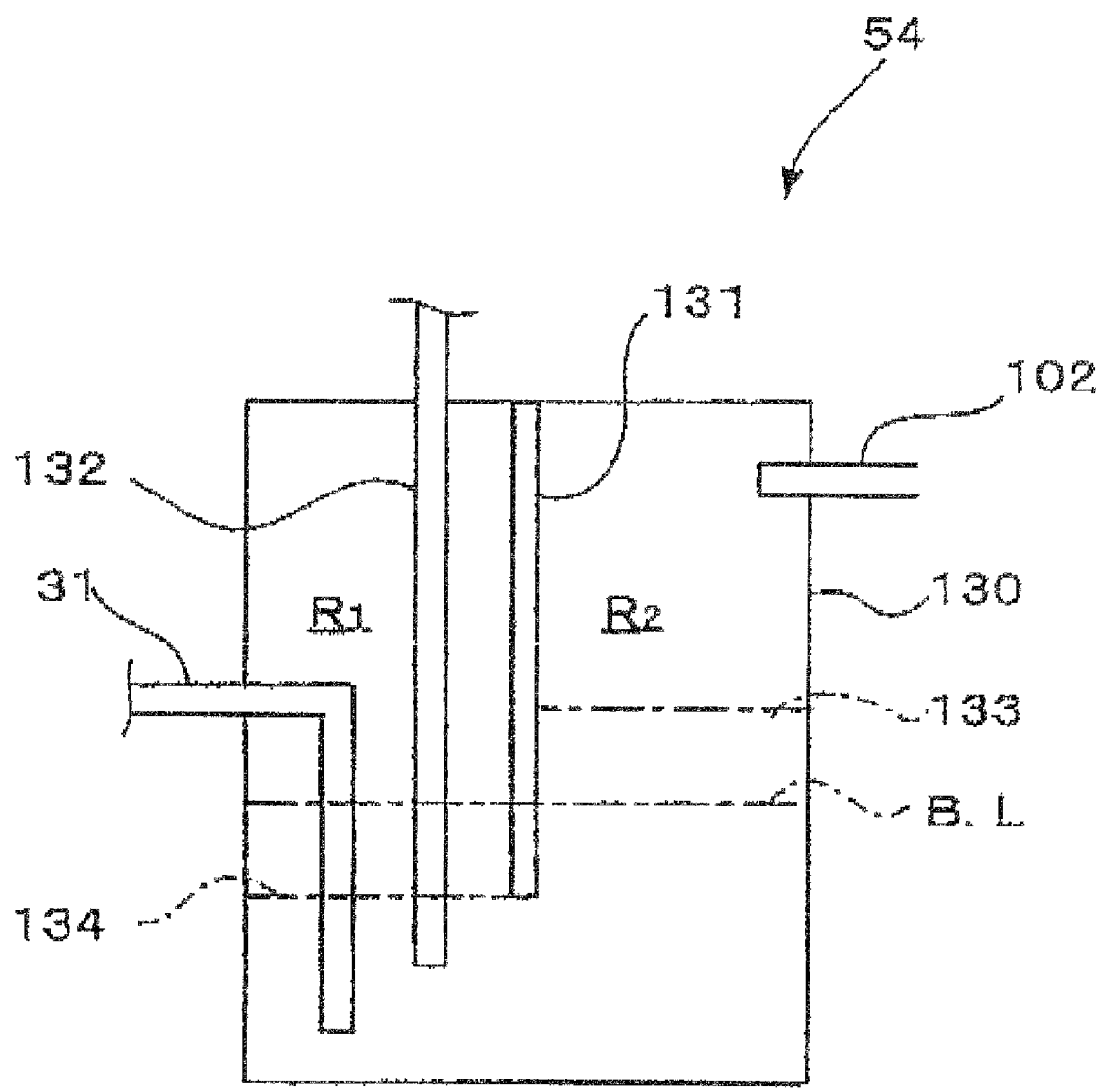
FIG. 6 is a view explaining the structure of a water-in tank.

The water-in tank 54 in FIG. 3 has a rectangular cylindrical casing 130, which is partitioned into two rooms by a partition plate 131. The lower edge of the partition plate 31 is positioned at a given height up from the bottom of the casing 130 (FIG. 6).

The left room $R_1$ partitioned by the partition plate 131 is provided with an atmosphere pipe 132 open to the atmosphere, and the lower end of the atmosphere pipe 132 is positioned lower than that of the partition plate 131. The left room $R_1$ accommodates an end portion of the off-gas pipe 31 extending from the oil tank 28, and the end portion of the off-gas pipe 31 extends close to the bottom of the casing 130 and to a position lower than that of the lower end of the atmosphere pipe 132. The right room $R_2$ partitioned by the partition plate 131 accepts an end portion of the line 102 and is connected to the accumulation tank 55. In the water-in tank 54, water is stored up to a level higher than the lower edge of the partition plate 131 to form a base level B.L. Now, when the pressure in the right room $R_2$ decreases (when the engine takes in a large quantity of off-gas), the pressure of the right room $R_2$ is lowered than that of the left room $R_1$ so that the water level in the left room $R_1$ is lowered to a position 134, which is lower than the base level B.L, and the water level in the light room $R_2$ rises up to an upper position 133. Accordingly, the pressure of the left room $R_1$ decreases so that the off-gas goes out more easily from the off-gas pipe 134, while the off-gas is supplied to the right room $R_2$ to thereby increase the pressure of the right room $R_2$ so that the water level in the right room $R_2$ is lowered and the water level in the left room $R_1$ rises. Then, if the respective pressures in both rooms increase extraordinarily higher than the atmospheric pressure, water is discharged outside through the atmosphere pipe 132. Namely, it is possible to determine a supply quantity and a consumption quantity of the off-gas by detecting the position of either one of the water levels in the right room $R_2$ and the left room $R_1$ by means of a level meter. Thus detected signals are fed to the controller (FIGS. 3, 4) mentioned above, and correspondingly the off-gas quantity to be supplied to the dual-fuel engine is adjusted.

Figure 7:
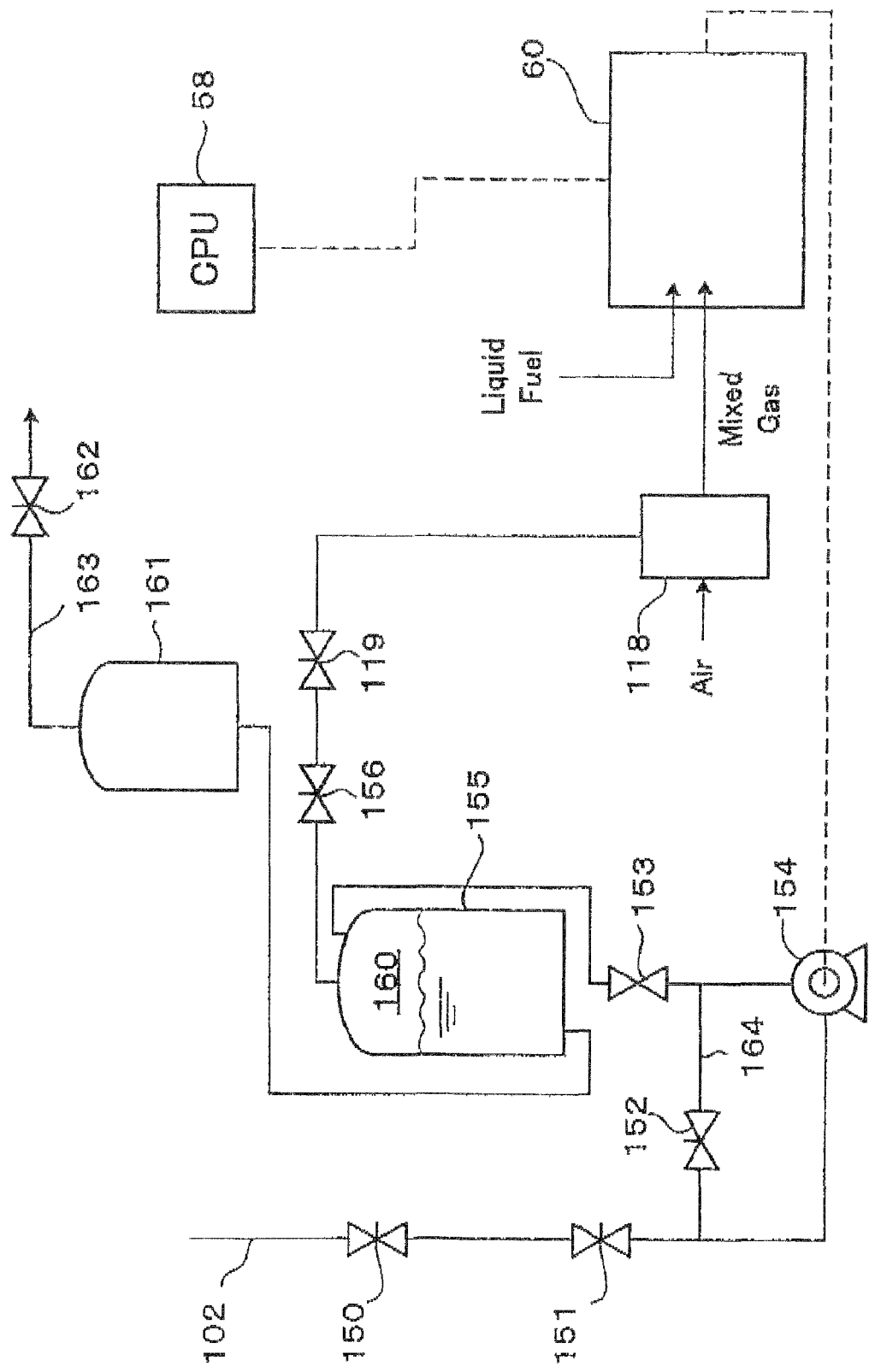
FIG. 7 is a system flowchart of the dual fuel engine.

As shown in FIG. 7, the off-gas line 102 is provided with an on/off safety valve 150 and a flow control valve 151. The line 102 terminates at a compressor 154, the compressor 154 being operated by the power of the generator 60. The off-gas compressed by the compressor 154 passes through a flow control valve 153 and flows into the accumulation tank 155. In the accumulation tank 155 is stored water and in an upper space 160 above the water surface is stored the off-gas. When the upper space 160 becomes larger (when a larger quantity of the off-gas is compressively stored), the water in the accumulation tank 155 comes into a water tank 161, which is connected to a relief valve 162 through a pipe 163. Before the flow control valve 153 is provided a line 164, on which a pressure control valve 152 for the off-gas is mounted. If the pressure of the compressed off-gas fed from the compressor 154 exceeds a predetermined value, part of the off-gas passes through the valve 152 and returns to the line 102, where the returning off-gas joins fresh off-gas flowing through the line 102 and comes in the compressor 154 again.

The compressed off-gas fed from the accumulation tank 155 passes through a maximum flow control valve 156 and the control valve 119 mentioned before, which opens or closes, depending on a load applied to the engine 110 (FIG. 4) of the generator 60, comes in the mixing unit 118, where the off-gas is mixed with air, and the mixed gas flows into the engine 110. Then, the controller 58 controls, as shown in FIG. 4, the control valve 119, the mixed gas control valve 117, and the fuel injection pump 115 to thereby adjust the respective quantities of the mixed gas and the liquid fuel (blend oil) to be supplied. According to experiments, it turned out that when the proportion of the mixed gas to the liquid fuel is within 7 to 3, the engine operates normally but if the proportion of the mixed gas exceeds the above range, they become out of balance, causing engine-knocking. In practical operation of the dual-fuel engine, at first the liquid fuel is fed for initial rotation of 1500 rpm as a standard control pattern and subsequently the off-gas is fed to the engine so that the quantity of the liquid fuel injected by the fuel injection pump 115 is reduced under the control of the controller CPU 58 to thereby throttle down the engine.

Figure 8:
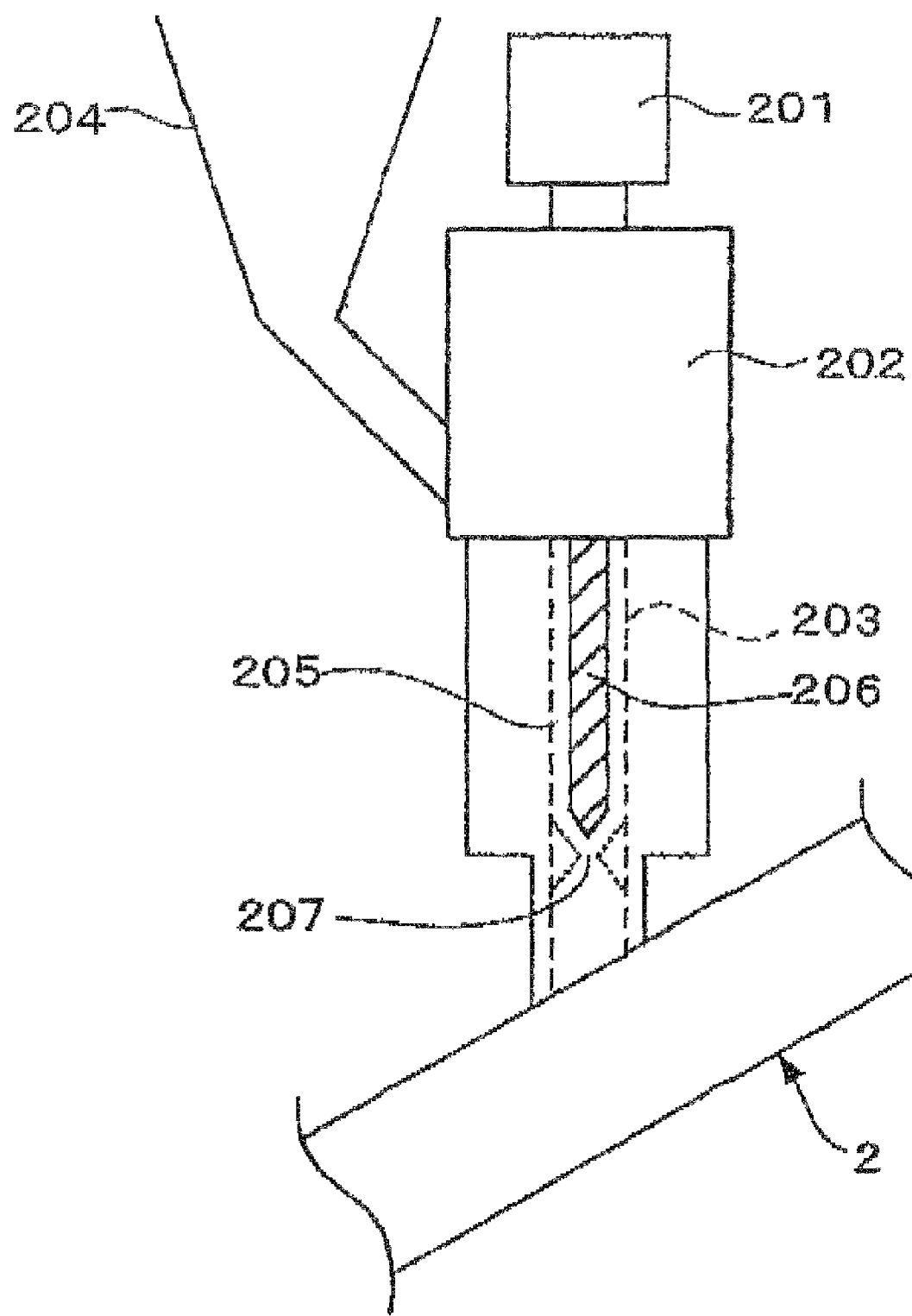
FIG. 8 is a diagram for explaining another embodiment of a gel-forming unit.

The gel-forming unit may preferably be formed in a vertically long configuration as shown in FIG. 8 so that the apparatus can be constructed in a compact size as a whole.

Specifically, a motor 201 is mounted on a frame 202 and a cylinder 203 is disposed vertically. Plastic pieces are obliquely fed from a hopper 204 to a space hole 205 of the cylinder 203 and melted. Here, the tip end of a screw 206 in the space hole 205 is tapered to form a tapered portion.

The present invention is most preferably applied to the liquefaction of waste plastic, especially polypropylene, polyethylene, and polystyrene by using the thermal decomposition method. Namely, the waste plastic as industrial waste disposals can be effectively utilized, and the off-gas generated in the present apparatus can be used as part of the power source for the generator, and in particular, in the case that the off-gas is used for the dual-fuel engine, the liquefied product oil and the off-gas can be utilized to the fullest.

In the conventional apparatus for conversion-to-oil, if too much quantity of plastic pieces is fed, or a large quantity of PE (polyethylene) with a large melting energy is fed to the decomposing unit from the hopper, the rotation of the lead screw is obstructed by the viscosity of the molten plastic during the melting process unfavorably, which is so-called clogging phenomenon. On the other hand, in the embodiment of the present invention, the melting unit is constructed like an injection molding machine to melt plastic pieces into plastic gel by frictional heating and heat from heaters and feed the plastic gel to the decomposing unit. Thus, the variously mixed plastic pieces can be surely melted without clogging the melting unit and the clogging phenomenon can be prevented and plastic can be efficiently treated.

Further, in the case that the catalyst cylinder for treating PE is employed, the vaporized gas does not always pass through the catalyst cylinder of the decomposing unit but partially comes in the residue takeout unit, which could be cooled without being completely decomposed. The thus non-decomposed oil, which has been liquefied without passing through the catalyst cylinder, would be stored in the residue tank. On the other hand, the present embodiment is provided around the catalyst cylinder of the decomposing unit with prevention means (fan for pressure control, valves of the residue takeout unit, etc.) for preventing the vaporized gas from coming into the residue takeout unit and being liquefied into non-decomposed oil. Namely, since the non-decomposed oil is prevented from being stored in the residue tank, plastic can be treated much more efficiently.

Furthermore, in the conventional conversion-to-oil apparatus, the recovered product oil is usually mixed oil including gasoline content, kerosene content, light oil content, and heavy oil content, which may be no problem when such mixed oil is filtrated to be burned in a waste oil boiler. However, when such mixed oil is used for driving the diesel engine, the gasoline content tends to cause a burning problem or wash away the lubricant of the engine, resulting in burning-out of the engine. On the other hand, the conversion-to-oil apparatus of the present embodiment is provided with a diesel-powered generator, which uses the oil obtained by subjecting the produced oil to the bubbling treatment for removing gasoline content or blend oil obtained by blending the produced oil with food oil. Thus, the generator can operate smoothly and efficiently and therefore plastic can be efficiently treated. Still furthermore, when a dual-fuel engine is employed for the generator, off-gas can be utilized as an effective energy and plastic can be treated much more efficiently.

Second Embodiment

Next, a second embodiment of the present invention is described with reference to the drawings.

Figure 9:
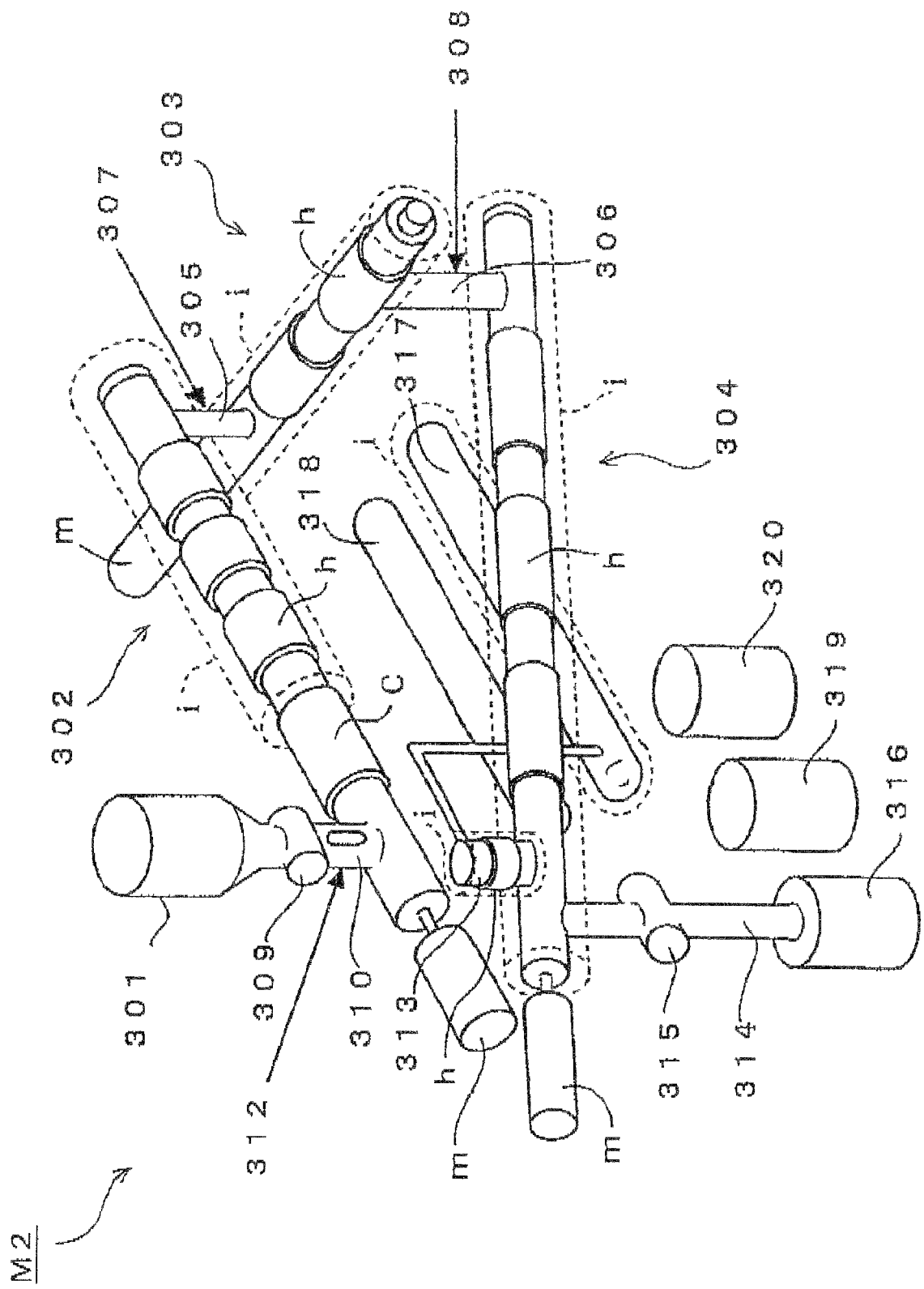
FIG. 9 is a view roughly showing the structure of the present invention.

In FIG. 9, a conversion-to-oil apparatus M2 according to the second embodiment comprises a hopper 301, to which crushed plastic pieces are fed, the hopper 301 being mounted to an end portion of a first melting unit 302 for melting the plastic pieces, the other end portion of the first melting unit 302 being connected to an end portion of a second melting unit 303, which extends perpendicularly to the first melting unit 302, the other end portion of the second melting unit being connected to a lower end portion of a vaporizing unit 304 for vaporizing the melted plastic, the vaporizing unit extending in a slant direction. Each of the first and second melting units 302, 303 and the vaporizing unit 304 has a cylindrical body, in which a lead screw is mounted. The plastic is continuously fed by the rotations of the lead screws. Around the cylinders are wound belt-like heaters h, h . . . h, by which respectively the plastic, the molten plastic liquid, and the vaporized plastic gas in the cylinders are heated. The belt-like heaters h, h . . . h and the cylindrical bodies of the first and second melting units 302, 303 and the vaporizing unit 304 are covered with thermal insulation members i, respectively. At the ends of the cylindrical bodies are mounted motors m, m, m, respectively, which are connected to the lead screws to rotate each at a predetermined speed.

At a first connecting portion between the first melting unit 302 and the second melting unit 303 is provided a vertical connection pipe 305, and at a second connecting portion between the second melting unit and the vaporizing unit 304 is provided another vertical connection pipe 306. Through the connection pipes 305, 306, nitrogen 307, 308 is introduced into each of the cylinders for assuring safety (for preventing the vaporized gas from burning). Under the hopper 301 is located a feeding pipe 310, to which a rotary valve 309 for feeding the plastic in the hopper 301 to the first melting unit 302 for every predetermined quantity is mounted.

The cylindrical body of the melting unit has its portion adjacent to the feeding pipe 310 provided with a cooling jacket so that the plastic is not melted near the hopper. Nitrogen 312 is also fed to the feeding pipe 310.

Adjacent to an end portion of the vaporizing unit 304 of the conversion-to-oil apparatus M2 is located a catalyst cylinder 313 and concretely, as shown in FIG. 9, the catalyst cylinder 313 extends vertically and upwardly from an upside end portion of the vaporizing unit 304. In the catalyst cylinder 313 is stored a catalyst of zeolite. The catalyst may be of synthesis zeolite preferably having an effective fine diameter of 9 to 10 mm and having a ratio of 2.5 times $SiO_2$ to $Al_2O_3$, and of spherical piece having a size of 2.4 to 4.7. This catalyst is able to decompose n-paraffin including C3 or more and therefore suitable for treating PE.

At a position more adjacent to the upper end portion of the vaporizing unit 304 than the connecting position to the catalyst cylinder 313 extends downwardly a residue pipe 314. At an intermediate position of the residue pipe 314 is located a valve 315 as a rotary valve, which discharges a residue to a residue tank 316 located below the valve 315 while maintaining the upper space of the residue pipe in a sealed condition.

Between the first melting unit 302 and the vaporizing unit 304 are located two condensers 317, 318. Of them, a first condenser 317 is provided for heavier oil, which compresses the vaporized gas passing through the catalyst cylinder 313 to liquefy it and produces heavier oil while cooling the vaporized gas by air. The other condenser, as a second condenser 318, compresses the vaporized gas passing through the first condenser 317 to liquefy it and produces lighter oil, to which cooling water is supplied. The heavier oil has a high compression temperature and is therefore sufficient to be cooled by air and is covered with a thermal insulation material i.

The heavy oil produced by the first condenser 317 is stored in a heavier oil tank 319 and the lighter oil produced by the second condenser 318 is stored in a lighter oil tank 320.

Figure 10:
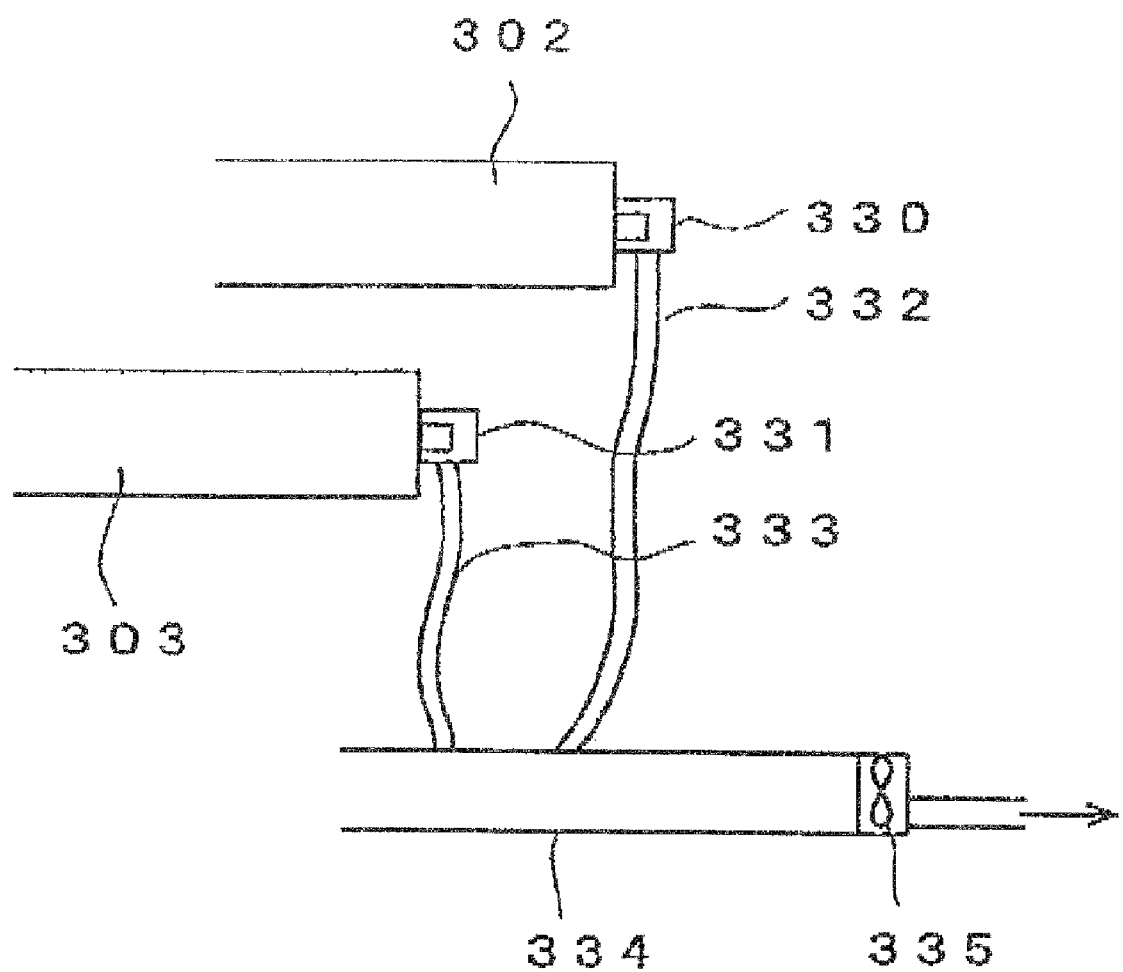
FIG. 10 is a view showing the end portions of a melting unit and a decomposing unit.

In FIG. 10, at bearing portions of the lead screws of the first and second melting units 302, 303 and the vaporizing unit (not shown) are provided cover members 330, 331, respectively. To the cover member 330 and the cover member 331 are connected pipes 332, 333, respectively, both of which 332, 333 are connected to a collecting pipe 304. At an end of the collecting pipe 334 is mounted a fan 335, by which leaking gas is discharged outside.

Figure 11:
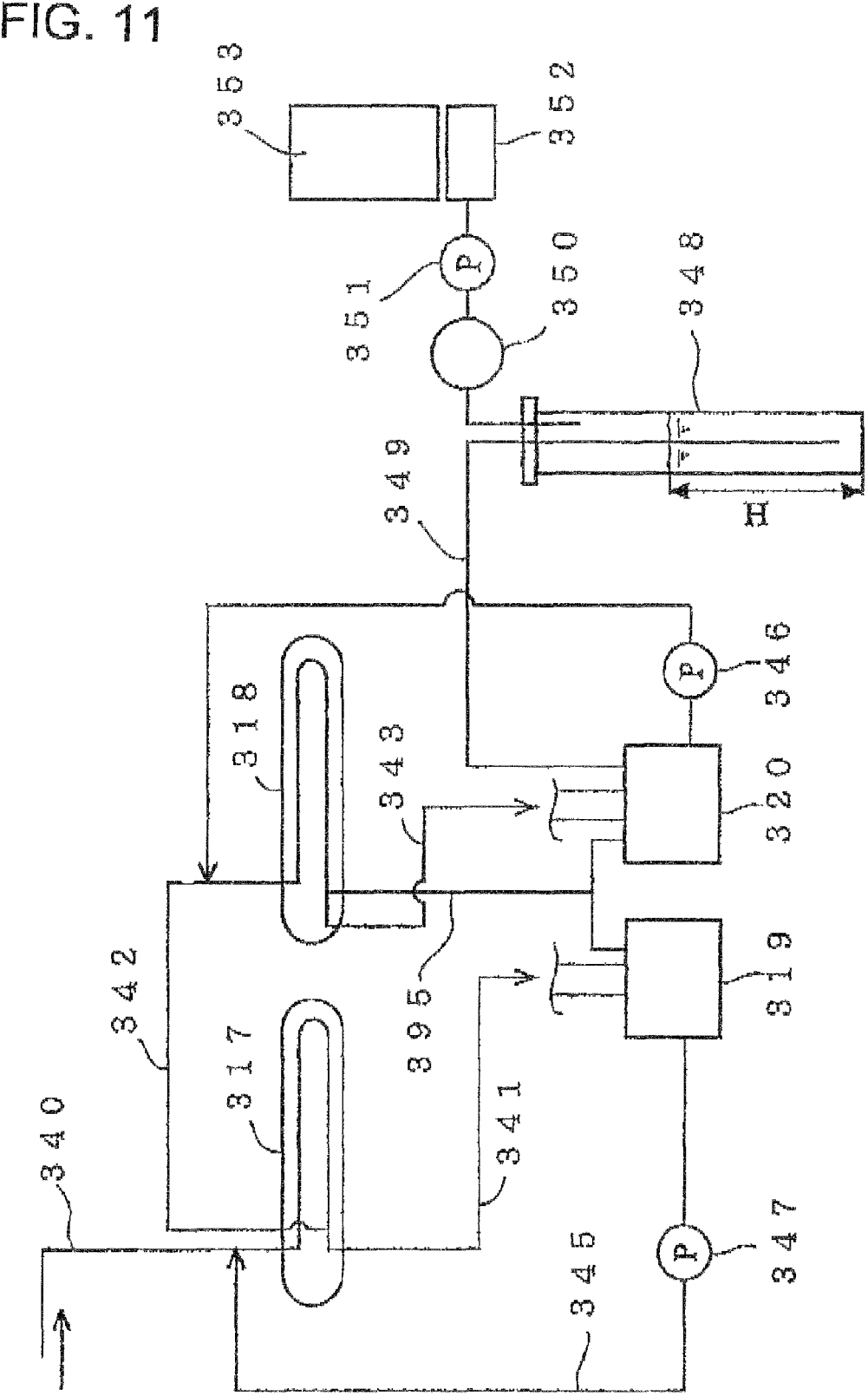
FIG. 11 is a block diagram showing a pipe arrangement for vaporized gas.

In FIG. 11, the vaporized gas passing through the catalyst cylinder 313 is fed through a pipe 340 and comes in the first condenser 317 to be liquefied to be heavier oil, which is fed through a pipe 341 and stored in the heavier oil tank 319.

Then, the vaporized gas that has not been liquefied by the first condenser 317 passes through a pipe 342 and comes in the second condenser 318, while the liquefied lighter oil passes through a pipe 343 to be stored in the lighter oil tank 320. The off-gas that has not been liquefied by the second condenser 318 passes through a pipe 395 and comes in both tanks 319 and 320. The off-gas, coming out of the tanks 319, 320, passes through a pipe 349 and flows into water stored in a water cylinder 348. The off-gas coming out of the water passes through an accumulator 350 and a suction pipe 351 and is supplied to a burner 352 to be burned. The burner 352 heats a water tank 353 to thereby make hot water. By controlling the level H of the water in the water cylinder 348, the pressure of the vaporized gas and the pressure in the liquefaction line are controlled.

Figure 12:
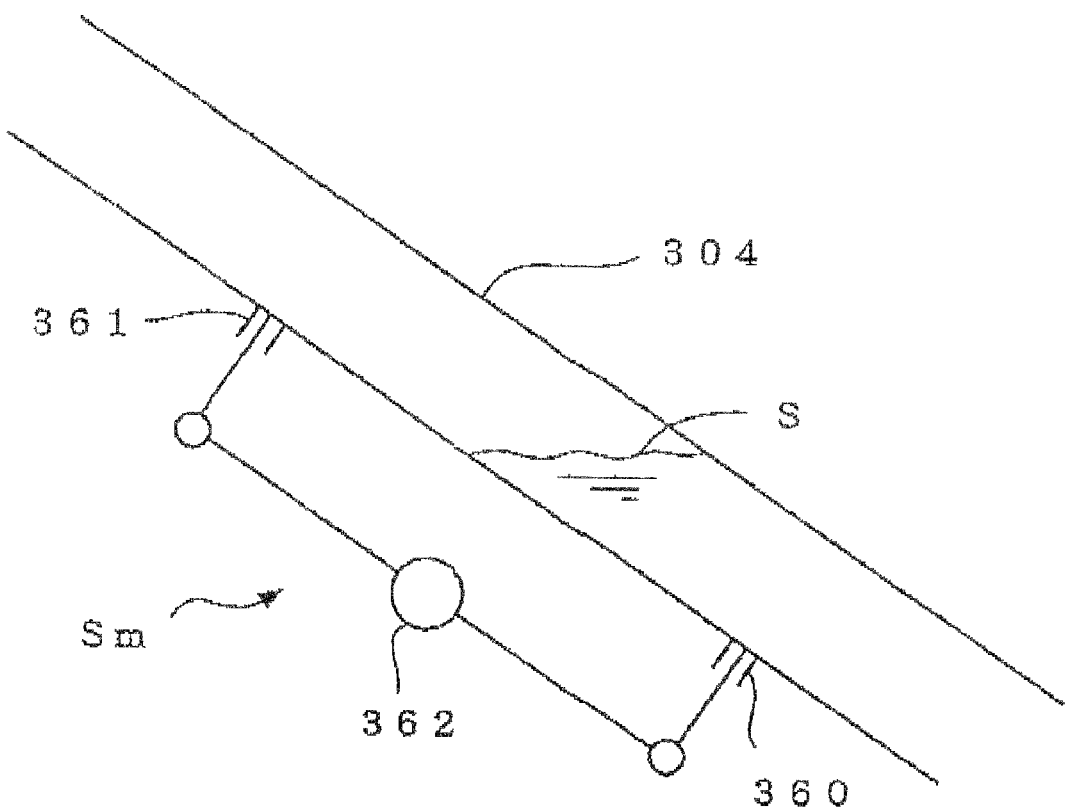
FIG. 12 is a view for explaining a fluid level meter for molten plastic.

In FIG. 12, the vaporizing unit 304 is provided with a liquid level meter Sm for detecting the level S of the liquefied plastic, the liquid level meter Sm including nitrogen blow-off ports 360 and 361 arranged distant from each other, and a controller 362. The level S of the liquefied plastic can be determined by detecting the blow-off pressure of nitrogen. According to FIG. 12, since the pressure around the blow-off port 360 is higher than that around the blow-off port 361, it is determined that the level S is at an intermediate position between the blow-off ports 360 and 361.

Figure 13:
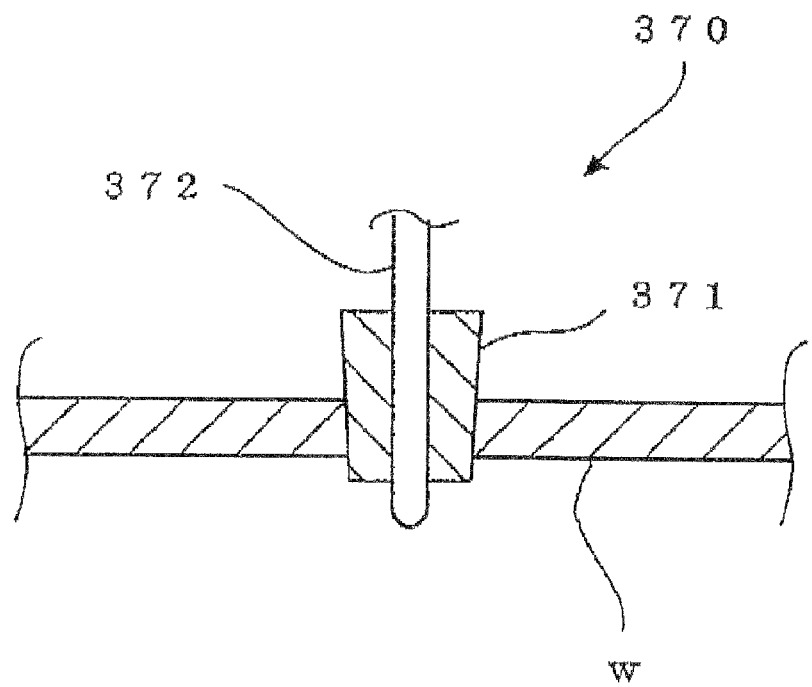
FIG. 13 is a view for explaining an attached condition of a thermometer.

As shown in FIG. 13, a thermometer 370 for determining a temperature in each of the cylinders of the first and second melting units 302, 303 and the vaporizing unit 304 has a thermoelectric couple 372 enclosed with a ceramic protection member 371 penetrated through a cylinder wall w of each of the cylinders. The thermometer is able to detect the temperature inside of the cylinder, without detecting the temperature of the outer wall of the cylinder owing to the protection member 371.

Figure 14:
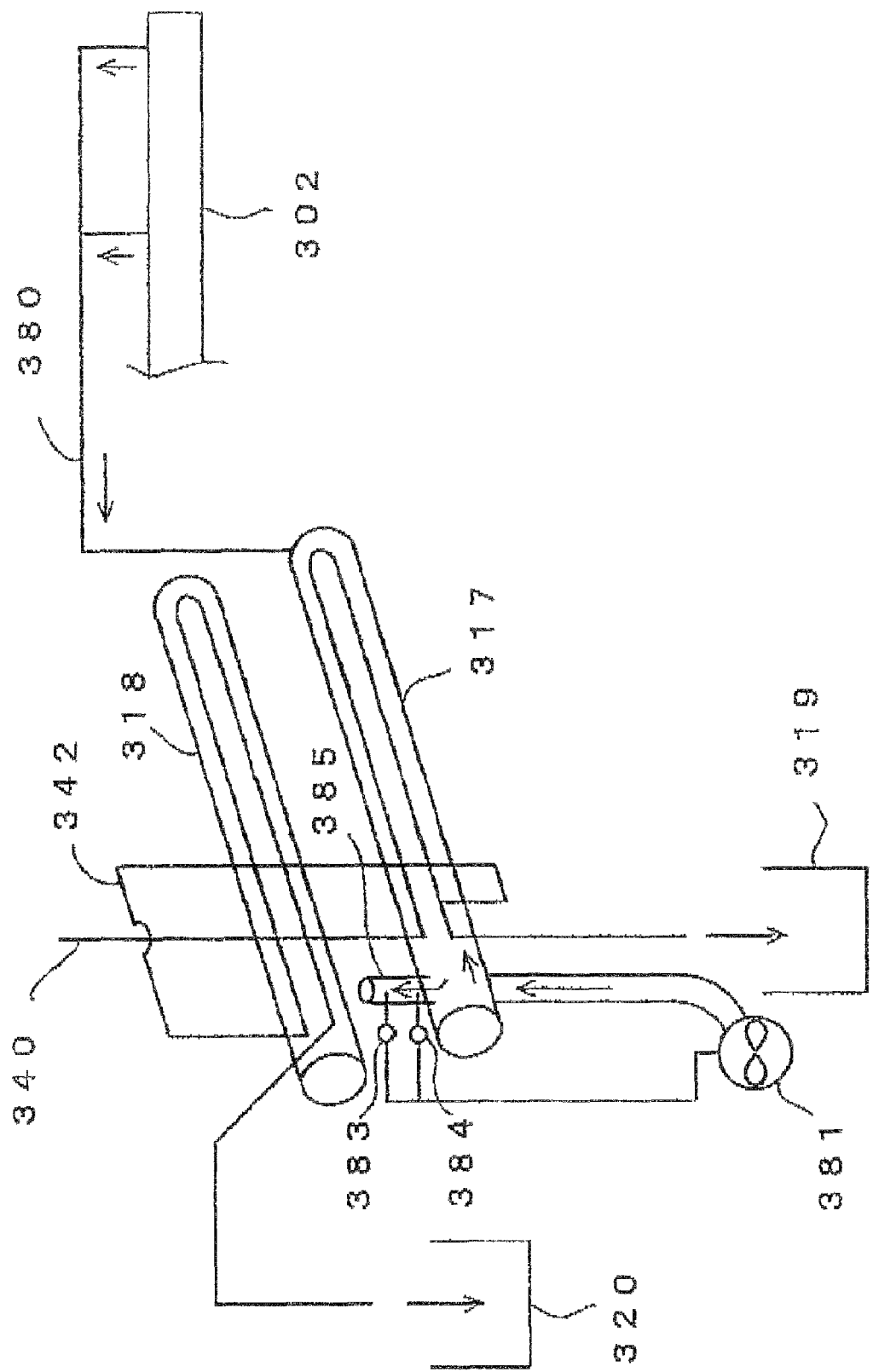
FIG. 14 is a view for explaining the function of a condenser.

In FIG. 14, the first condenser 317 is supplied with air by a fan 381, while at a discharge port 385 for discharging the air are mounted a thermometer 383 and a flow meter 384, so that if the fan 381 is controlled based on the temperature and flow quantity of the discharged air, the cooling temperature of the first condenser 317 can be controlled to thereby control the quality of the heavier oil.

Further, in the melting unit 302 is emitted aqueous vapor from the plastic being melted, which vapor is fed to the first condenser 317 through the pipe 380 so as to control the temperature in the condenser 317. The temperature in the first condenser 317 may preferably be 200° C. to 300° C., in which range the liquefaction to heavier oil is suitably achieved.

Next, another embodiment of the residue pipe is described.

Figure 15:
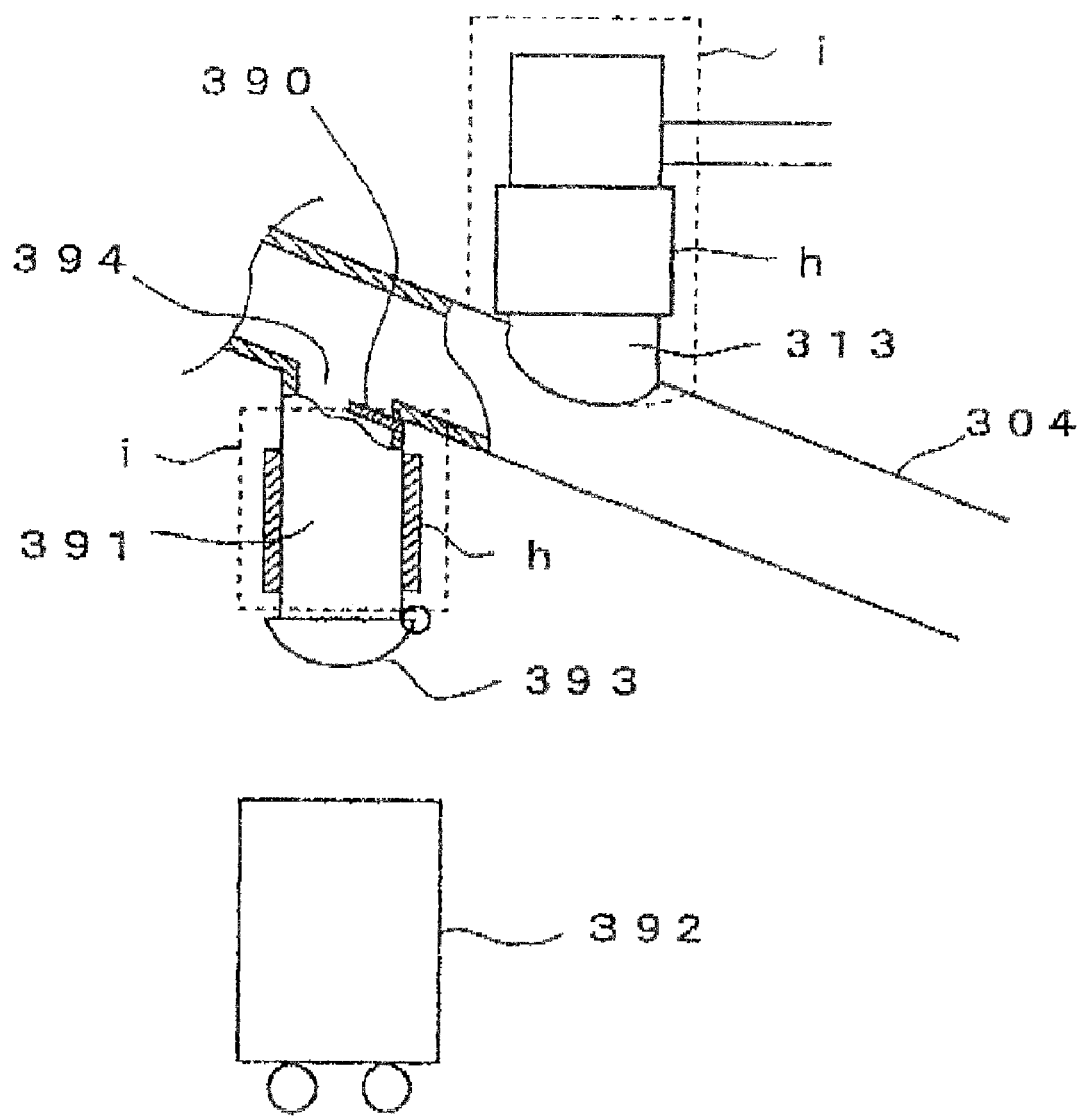
FIG. 15 is a view showing the upper part of a vaporizing unit

In FIG. 15, adjacent to an end portion of the vaporizing unit 304 of the conversion-to-oil apparatus M2 is provided a residue pot 391 for receiving the residue and heating it. Concretely, the residue pot 391 is located below at a position obliquely upward from the connecting portion to the catalyst cylinder 313. At the bottom of the residue pot 391 is provided an open/close lid 393 and around the residue pot 391 is provided a heater h, by which the vaporized gas coming in the residue pot is heated and goes up to the catalyst cylinder 313.

Even if there remains not-fully vaporized plastic in the residue, such plastic is finally vaporized in this residue pot and therefore only the pure residue is left in the residue pot. After a predetermined quantity of the residue is accumulated, the open/close lid 393 is opened to feed the residue to the residue tank 392. On the other hand, the vaporized gas flowing down to the residue pipe is prevented from being liquefied in the residue pipe so that the resultant oil would come in the residue tank. In addition, at an inlet 394 of the residue pot 391 is provided a projecting member 390, by which the residue is prevented from sticking to the peripheral wall of the residue pot.

Incidentally, in the hopper 7 of the melting unit 1 of the first embodiment or the hopper 301 of the first melting unit 302 of the second embodiment, if the temperature of the lower end portion of the hopper becomes so high, the plastic to be fed to the melting unit would be already melted here and thus melted plastic would be an obstacle to smooth feeding of the plastic. If necessary, it may be preferable to cool the periphery of the lower end portion of the hopper 7 or 301 with a water jacket. Thus, the plastic can be smoothly fed to the melting unit 1 or 302 by the way of cooling.

The conversion-to-oil apparatus of the present invention is particularly used for liquefaction of waste plastic and suitable for a small-sized conversion-to-oil apparatus.

As mentioned above, in the conventional apparatus, among variously used plastics, PP (polypropylene) and PS (polystyrene) are ready to be liquefied but the liquefaction of PE (polyethylene) is difficult and liable to cause a non-decomposed product like paraffin because of delicate control of its liquidity. On the other hand, according to the present invention, since the synthesis zeolite composed of silicon oxide ($SiO_2$) and alumina ($Al_2O_3$) is used, not only PP (polypropylene) and PS (polystyrene) but also PE (polyethylene) can be completely decomposed. Thus the present invention enables efficient liquefaction of plastic.

Further, as for the case provided with the residue pipe, it could sometimes occur that after the molten plastic is vaporized, the vaporized gas comes in the residue pipe for taking the residue and then the resultant oil coming from the residue pipe is left in the residue tank. However, the residue pot of the present embodiment enables the residue, even still involving the molten plastic, completely to be vaporized, namely, enables plastic efficiently to be processed.

What is claimed is:

1. An apparatus for converting plastic into oil, comprising:
   a gel-forming unit for melting plastic pieces into plastic gel;
   a decomposing unit for heating and decomposing the plastic gel, the decomposing unit having a cylindrical body slanted upwardly as a whole, a lead screw mounted therein and a heater around the cylindrical body;
   a catalyst cylinder mounted on an upper end portion of the decomposing unit and extended upwardly;
   a residue takeout unit that is connected at an upper end portion of the decomposing unit so as to extend downwardly; and
   a prevention means for preventing decomposed gas from flowing down to the residue takeout unit,
   wherein a connecting position where the residue takeout unit is connected to the slanted decomposing unit is deviated-obliquely upwardly of the slanted decomposing unit from a connecting position where the catalyst cylinder is connected to the decomposing unit, the residue takeout unit comprising a residue pot that has a heater for heating decomposed gas so that the decomposed gas goes up to the catalyst cylinder, and the gel-forming unit is provided with a screw mounted in a cylinder and a heater for heating the cylinder so that the plastic pieces are melted into plastic gel by frictional heating due to a feeding force of the screw and heat from the heater.

2. The apparatus according to claim 1, wherein the prevention means for preventing decomposed gas from flowing down is a suction unit mounted at a plastic gas takeout port of the catalyst cylinder and for sucking the decomposed gas.

3. The apparatus according to claim 1, wherein the catalyst cylinder contains synthesis zeolite composed of silicon oxide and alumina.

4. The apparatus according to claim 1, wherein the residue pot has an open/close lid member.

5. The apparatus according to claim 1, further comprising:
   a first condenser for liquefying the decomposed gas to produce a heavier oil; and
   a second condenser for liquefying the decomposed gas to produce a lighter oil.

6. The apparatus according to claim 5, wherein the first condenser is cooled by air while the second condenser is cooled by water.

* * * * *